N. WEISS.
AUTOMOBILE FENDER.
APPLICATION FILED APR. 13, 1918.
1,275,113.
Patented Aug. 6, 1918.
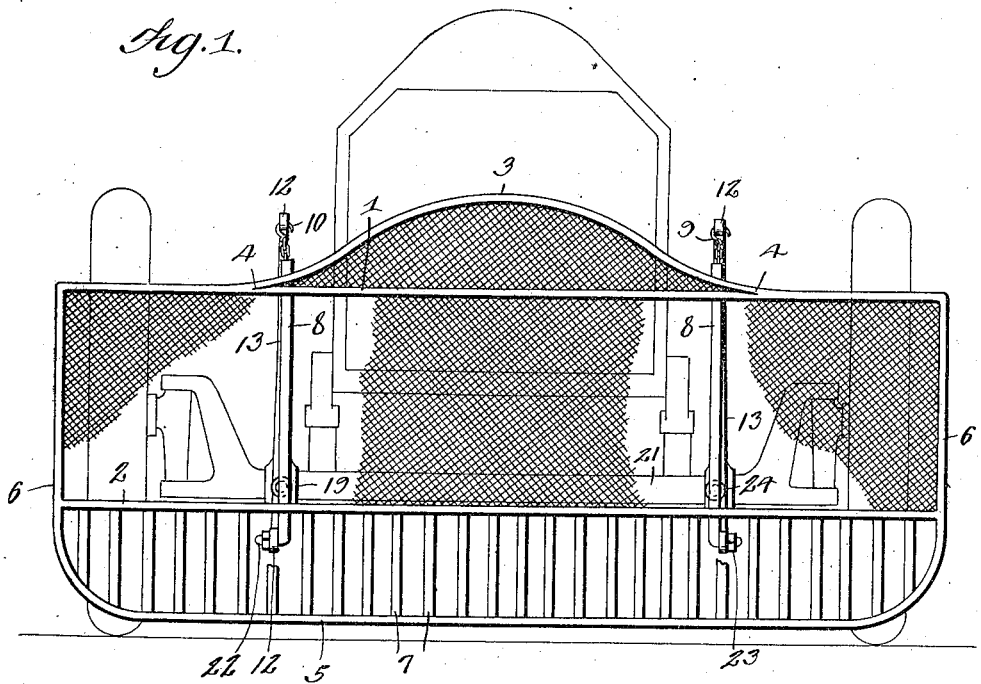
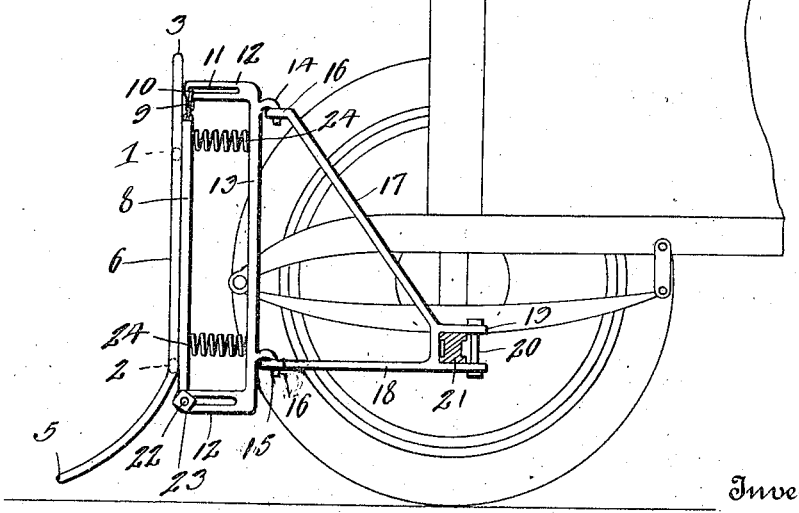
Witnesses
Inventor
N. Weiss,
By Victor J. Evans
Attorney United States Patent Office.

NETTIE WEISS, OF HARRISBURG, PENNSYLVANIA.

AUTOMOBILE-FENDER.

1,275,113.

Specification of Letters Patent.

Patented Aug. 6, 1918.

Application filed April 13, 1918. Serial No. 228,423.

*To all whom it may concern:*

Be it known that I, NETTIE WEISS, a citizen of the United States, residing at Harrisburg, in the county of Dauphin and State of Pennsylvania, have invented new and useful Improvements in Automobile-Fenders, of which the following is a specification.

This invention relates to automobile fenders, the object in view being to provide a fender which may be readily attached to and detached from a motor vehicle and which embodies a novel construction and relative arrangement of parts whereby the impact of a person or object against the fender is yieldingly or flexibly sustained, enabling a person to be picked up without injury.

With the above and other objects in view, the invention consists in the construction, combination and arrangement of parts, as herein described, illustrated and claimed.

In the accompanying drawings,

Figure 1 is a front elevation, showing the improved fender in its applied relation to a motor vehicle.

Fig. 2 is a side elevation of the same.

The frame of the fender or scoop comprises upper and lower horizontal frame bars 1 and 2, the lower frame bar 2 being of greater length than the frame bar 1, so that the opposite portions of the fender or scoop may extend in advance of the front wheels of the vehicle to prevent the wheels from running over a person who may fall or be thrown in front of the fender. The scoop frame also comprises an arched top bar 3, the end portions of which project laterally to the same extent as the bar 2, the bars 1 and 3 being united at the points 4. A forwardly curving bottom bar 5 is connected to the opposite extremities of the bar 2 and embodies side upright portions 6 which extend upwardly to the opposite extremities of the bar 3 to which they are connected. The space between the bars 1, 2 and 6 and also the space between the bars 1 and 3 are covered with any suitable fabric, such as wire, and the space between the bars 2 and 5 is covered with slats 7, said slats being curved to conform to the forward curvature of the bottom portion of the scoop frame.

Fastened to the rear side of the scoop frame above described, are two upright bars or rods 8, and extending from the upper extremities of said bars 8 are flexible connections 9 such as chains, having hooks 10 at the upper ends thereof which are inserted in horizontal and fore and aft elongated guide ways 11 in the upper and lower forwardly extending arms 12 of guide frames 13 having adjacent to the top and bottom portions thereof rearwardly extending top and bottom hooks 14 and 15 which are detachably inserted through eyes 16 in the forward extremities of the forwardly diverging arms 17 and 18 of fender supporting brackets 19 secured by suitable fastening means 20 to the front axle 21 of the motor vehicle in the manner illustrated in the drawings. The lower extremities of the bars or rods 8 are formed with lateral extensions 22 which extend through the guide ways 11 at the bottom of the guide frame and are threaded to receive retaining nuts 23. Cushioning springs 24 are interposed between the bars 8 and the upright bars of the guide frames 13 and serve to yieldingly support the scoop frame at the forward limit of its movement, and said springs also serve to cushion the blow when a person or object is struck by the scoop or fender proper. When the fender strikes a person or object, the main body of the fender or scoop is adapted to yield rearwardly both at the top and bottom thereof, and in addition to the sliding movement of the hooks 10 in the upper guide ways 11, the chains 9 also form an additional flexible and yielding support for the upper part of the scoop. This prevents injury to a person struck by the fender. When not needed in use, the fender may be lifted out of engagement with the supporting brackets and stored away.

I claim:

1. A fender for motor vehicles, comprising a scoop frame, vertically disposed bars fastened to said frame, chains attached to the upper extremities of said bars, lateral extensions at the lower extremities of said bars, a guide frame having forwardly extending upper and lower arms having guide ways and to which said chains and lateral extensions of the scoop frame are slidingly attached for yielding movement in a rearward direction, cushioning means interposed between the scoop frame and said guide frame, and means for detachably supporting said structure upon a motor vehicle.

2. A fender for motor vehicles, comprising a scoop frame, vertically disposed bars fastened to said frame, chains attached to the upper extremities of said bars, lateral extensions at the lower extremities of said bars, a guide frame having forwardly extending upper and lower arms having guide ways and to which said chains and lateral extensions of the scoop frame are slidingly attached for yielding movement in a rearward direction, cushioning means interposed between the scoop frame and said guide frame, means for detachably supporting said structure upon a motor vehicle, the fender supporting means comprising a pair of supporting brackets adapted to be secured to the front axle of the vehicle and each embodying forwardly diverging arms terminating in eyes arranged one above the other in spaced relation, and hooks on said guide frame adapted for insertion in said eyes.

In testimony whereof I affix my signature.

NETTIE WEISS.